(12) United States Patent
Kim et al.

(10) Patent No.: US 11,169,821 B2
(45) Date of Patent: Nov. 9, 2021

(54) METHOD OF OPERATING SELECTIVE WAKE-UP OF COMMUNICATION NODE IN VEHICLE NETWORK

(71) Applicants: HYUNDAI MOTOR COMPANY, Seoul (KR); KIA MOTORS CORPORATION, Seoul (KR)

(72) Inventors: Dong Ok Kim, Goyang-si (KR); Kang Woon Seo, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 16/420,859

(22) Filed: May 23, 2019

(65) Prior Publication Data
US 2019/0361711 A1    Nov. 28, 2019

(30) Foreign Application Priority Data

May 25, 2018 (KR) .................. 10-2018-0059844

(51) Int. Cl.
*G06F 9/4401* (2018.01)
*H04L 29/08* (2006.01)
(52) U.S. Cl.
CPC ............ *G06F 9/4418* (2013.01); *H04L 67/12* (2013.01); *H04L 69/323* (2013.01)
(58) Field of Classification Search
CPC . G06F 9/4418; H04L 12/12; H04L 12/40039; H04L 12/40273; Y02D 30/50
See application file for complete search history.

(56) References Cited

U.S. PATENT DOCUMENTS

| | | | |
|---|---|---|---|
| 2004/0022245 A1* | 2/2004 | Forbes | H04L 45/04 370/392 |
| 2011/0022699 A1* | 1/2011 | Powell | G06F 1/3209 709/224 |
| 2011/0194471 A1* | 8/2011 | Kim | H04W 52/0235 370/311 |
| 2013/0318380 A1* | 11/2013 | Behrens | H04L 12/12 713/323 |
| 2014/0081518 A1* | 3/2014 | Son | H04L 12/40 701/36 |
| 2016/0132455 A1* | 5/2016 | Ho | G06F 13/4208 710/105 |
| 2016/0364247 A1* | 12/2016 | Yun | G06F 9/4418 |
| 2017/0031421 A1* | 2/2017 | Chaplin | G06F 1/3209 |
| 2017/0318612 A1* | 11/2017 | Gu | H04W 4/48 |
| 2017/0374601 A1* | 12/2017 | Braga Ameixieira | H04L 61/6086 |
| 2018/0352512 A1* | 12/2018 | Kim | G06F 1/3209 |

\* cited by examiner

*Primary Examiner* — Raymond N Phan
(74) *Attorney, Agent, or Firm* — Morgan, Lewis & Bockius LLP

(57) ABSTRACT

An operation method of an end node including a physical (PHY) layer unit and a controller unit in a vehicle network includes: detecting, by the controller unit, a local event; in response to detecting the local event, transitioning an operation state of the controller unit from an OFF state to an ON state; transmitting, by the controller unit, to the PHY layer unit an indicator requesting to transmit a wake-up signal in accordance with the local event; and transmitting, by the PHY layer unit, the wake-up signal including an identifier of at least one end node required to be woken up by the local event.

14 Claims, 9 Drawing Sheets

- POWER-OFF MODE: PHY LAYER UNIT OFF, MAC LAYER UNIT OFF
- SLEEP MODE: PHY LAYER UNIT ON, MAC LAYER UNIT OFF
- ACTIVE MODE: PHY LAYER UNIT ON, MAC LAYER UNIT ON

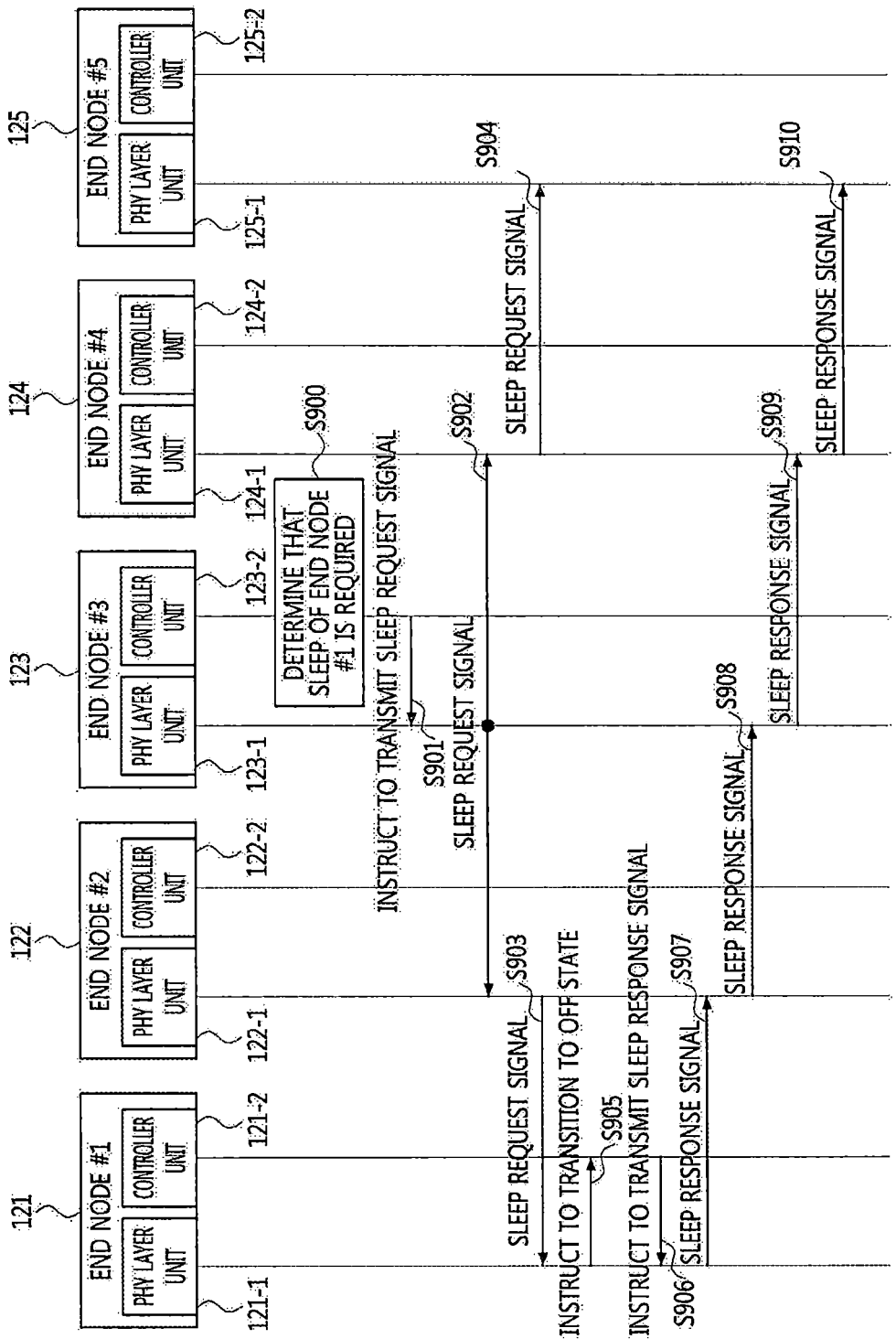

METHOD OF OPERATING SELECTIVE WAKE-UP OF COMMUNICATION NODE IN VEHICLE NETWORK

CROSS-REFERENCE TO RELATED APPLICATIONS

This application is based on and claims the benefit of priority to Korean Patent Application No. 10-2018-0059844, filed on May 25, 2018 in the Korean Intellectual Property Office (KIPO), the entirety of which is incorporated by reference as if fully set forth herein.

TECHNICAL FIELD

The present disclosure relates to vehicle network technology, and more specifically, to a selective wake-up technique for selectively waking up a specific communication node among communication nodes constituting a vehicle network.

BACKGROUND

Electronic devices installed in a vehicle have been increased significantly in their number and variety along with recent digitalization of vehicle parts. Generally, the electronic devices are used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The communication nodes constituting the Ethernet-based network may be connected in a daisy chain scheme. For example, the Ethernet-based network described above may comprise a first communication node, a second communication node, and a third communication node connected in a daisy chain scheme. Each of the first to third communication nodes may include a physical (PHY) layer unit and a controller unit. The first communication node may transmit a wake-up signal to the second communication node when a specific event is detected. The PHY layer unit of the second communication node receiving the wake-up signal may transition from OFF state to ON state.

The PHY layer unit of the second communication node may then transmit the wake-up signal to the controller unit of the second communication node. The controller unit of the second communication node receiving the wake-up signal may transition from OFF state to ON state. Accordingly, the second communication node may be woken up and operate in an active mode. The controller unit of the second communication node may identify a wake-up reason indicated by the wake-up signal after waking up. When the second communication node does not need to be woken up as a result of checking the wake-up reason indicated by the wake-up signal, the controller unit of the second communication node may transition from ON state to OFF state.

The second communication node may transmit a wake-up signal to the third communication node. The PHY layer unit of the third communication node receiving the wake-up signal may transition from OFF state to ON state. The PHY layer unit of the third communication node may transmit the wake-up signal to the controller unit of the third communication node. The controller unit of the third communication node receiving the wake-up signal may transition from OFF state to ON state. Accordingly, the third communication node may be woken up and operate in the active mode.

In this case, even when the communication node required to be woken up is the third communication node in accordance with the wake-up reason, not only the PHY layer unit but also the controller unit of the second communication node need to be woken up, so unnecessary power is consumed at the communication node.

SUMMARY

The present disclosure provides a method and an apparatus for transmitting and receiving a wake-up signal including information indicating a communication node to wake up in a vehicle network.

In accordance with an exemplary embodiment of the present disclosure, an operation method of an end node including a physical (PHY) layer unit and a controller unit in a vehicle network may comprise: detecting, by the controller unit, a local event; in response to detecting the local event, transitioning an operation state of the controller unit from an OFF state to an ON state; transmitting, by the controller unit, to the PHY layer unit an indicator requesting to transmit a wake-up signal in accordance with the local event; and transmitting, by the PHY layer unit, a wake-up signal including an identifier of at least one end node required to be woken up by the local event.

The wake-up signal may be a PHY layer signal generated by the PHY layer unit.

The identifier may be a global identifier used to uniquely identify the at least one end node in the vehicle network.

The identifier may be a local identifier used to uniquely identify the at least one end node in a specific region of the vehicle network.

The identifier may be a group identifier indicating a plurality of end nodes required to be woken up according to the local event.

The identifier may be configured with general purpose input/output (GPIO) pins, analog pins, or a PHY layer register.

In accordance with another exemplary embodiment of the present disclosure, an operation method of a first end node including a PHY layer unit and a controller unit in a vehicle network may comprise: receiving, by the PHY layer unit, a wake-up signal from a second end node, the wake-up signal including a first identifier of an end node required to be woken up; in response to the wake-up signal, transitioning an operation state of the PHY layer unit from an OFF state to an ON state; comparing, by the PHY layer unit, a second identifier of the first end node with the first identifier; and in response to determining that the second identifier is different from the first identifier, transmitting the wake-up signal to a third end node without waking up the controller unit.

The operation method may further comprise, in response to determining that the identifier of the first end node is identical to the identifier indicated by the wake-up signal, transmitting, by the PHY layer unit, to the controller unit an indicator requesting to transition from OFF state to ON state.

The wake-up signal may be a PHY layer signal generated by the PHY layer unit.

The identifier may be a local identifier used to uniquely identify an end node in a specific region of the vehicle network.

The identifier may be a group identifier indicating a plurality of end nodes required to be woken up according to the local event.

In accordance with still another exemplary embodiment of the present disclosure, an operation method of a first end node in a vehicle network may comprise: identifying a third end node required to be woken up when an operation mode of the first end node transitions from a sleep mode to an active mode based on a first wake-up signal received from a second end node; generating a second wake-up signal including a first identifier of the first end node and a second identifier of the third end node; and transmitting the second wake-up signal.

The operation method may further comprise, in response to detecting a local event, identifying a fourth end node required to be woken up based on the local event before the generating a second wake-up signal, wherein the second wake-up signal further includes an identifier of the fourth end node.

The identifier may be a group identifier indicating a plurality of end nodes required to be woken up according to the local event.

The second wake-up signal may be a PHY layer signal generated by a PHY layer unit included in the first end node.

In accordance with yet another exemplary embodiment of the present disclosure, an operation method of a first end node including a PHY layer unit and a controller unit in a vehicle network may comprise: receiving, by the PHY layer unit of the first end node operating in an active mode, a sleep request signal from a second end node; comparing, by the PHY layer unit, a first identifier of the first end node with a second identifier indicated by the sleep request signal; and in response to determining that the second identifier is identical to the first identifier, transmitting, by the PHY layer unit, to the controller unit an indicator requesting to transition from an ON state to an OFF state.

The operation method may further comprise transmitting, by the PHY layer unit, a sleep response signal indicating that the controller unit has transitioned from ON state to OFF state.

The sleep response signal may be a PHY layer signal generated by the PHY layer unit.

The identifier may be a local identifier used to uniquely identify an end node in a specific region of the vehicle network.

The identifier may be a group identifier indicating a plurality of end nodes required to be woken up according to the local event.

In accordance with the exemplary embodiments of the present disclosure, a wake-up signal including an identifier indicating a wake-up target (e.g., a target communication node) may be used, and the wake-up signal may be a PHY layer signal (e.g., in-band signal). In this case, the communication node receiving the wake-up signal may identify the wake-up target based on the identifier included in the wake-up signal without waking up the controller unit. When the identifier included in the wake-up signal is the same as the identifier of the communication node, the operation state of the controller unit of the corresponding communication node may transition from OFF state to ON state. On the other hand, when the identifier included in the wake-up signal is different from the identifier of the communication node, the operation state of the controller unit of the corresponding communication node may be maintained in OFF state. Therefore, unnecessary energy may not be consumed at the communication node, and thus the performance of the vehicle network can be improved.

BRIEF DESCRIPTION OF DRAWINGS

Exemplary embodiments of the present disclosure will become more apparent by describing in detail forms of the present disclosure with reference to the accompanying drawings, in which:

FIG. 9 is a sequence chart illustrating an operation method of a communication node connected in a daisy chain scheme in a vehicle network according to a fourth exemplary embodiment of the present disclosure.

Figure 1:
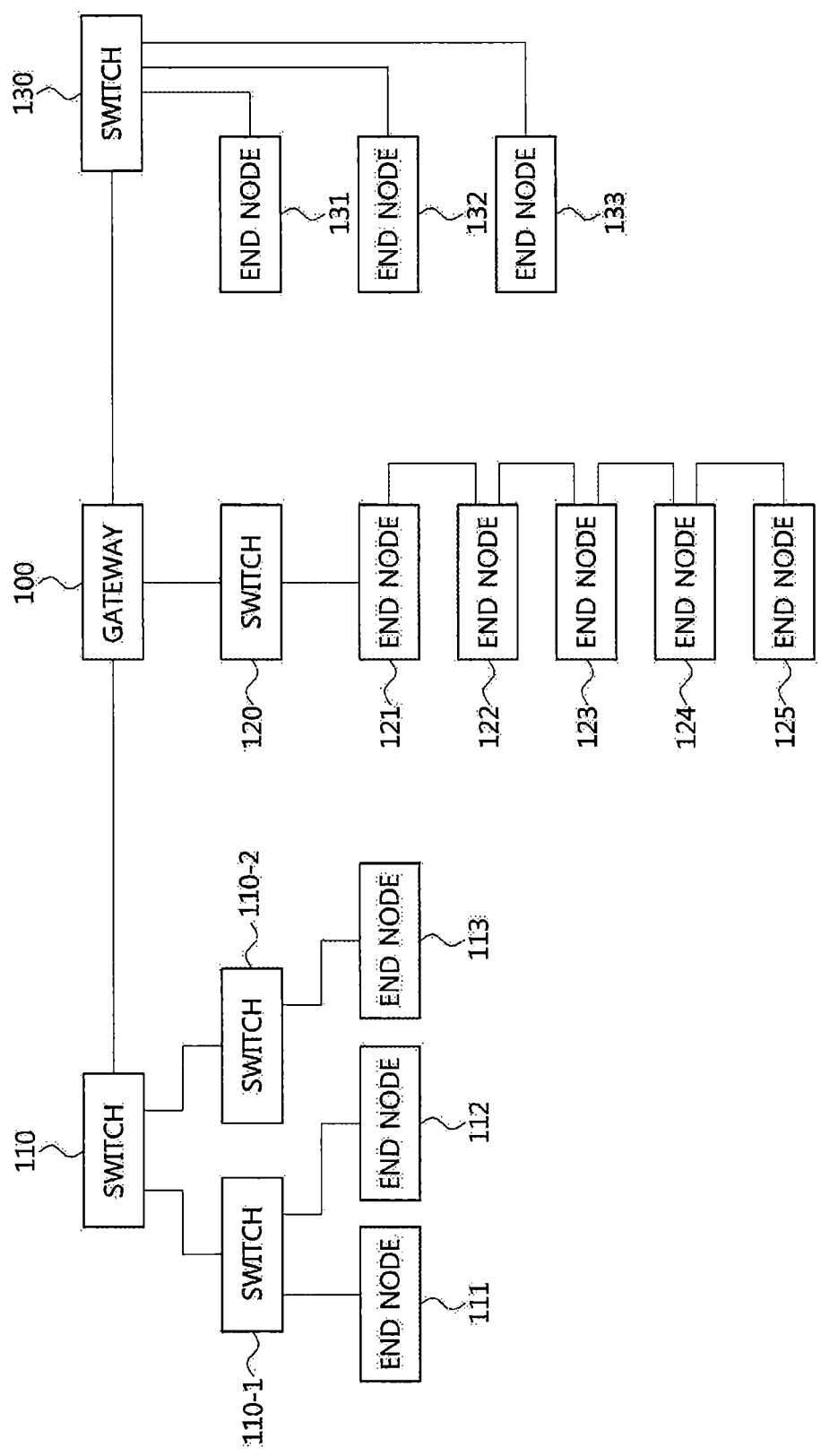
FIG. 1 is a block diagram illustrating a vehicle network topology according to a first exemplary embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a vehicle network topology according to a first exemplary embodiment of the present disclosure.

As shown in FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 124, 125, 131, 132, and 133. Each of the switches 110, 110-1, 110-2, 120, and 130 may interconnect the end nodes 111, 112, 113, 121, 122, 123, 124, 125, 131, 132, and 133, and control at least one of the end nodes 111, 112, 113, 121, 122, 123, 124, 125, 131, 132, and 133 connected to the switch.

Each of the end nodes 111, 112, 113, 121, 122, 123, 124, 125, 131, 132, and 133 may include an electronic control unit (ECU) configured to control various types of devices mounted within a vehicle. For example, each of the end nodes 111, 112, 113, 121, 122, 123, 124, 125, 131, 132, and 133 may include an ECU included in an infotainment device (e.g., a display device, a navigation device, and an around view monitoring device).

The communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
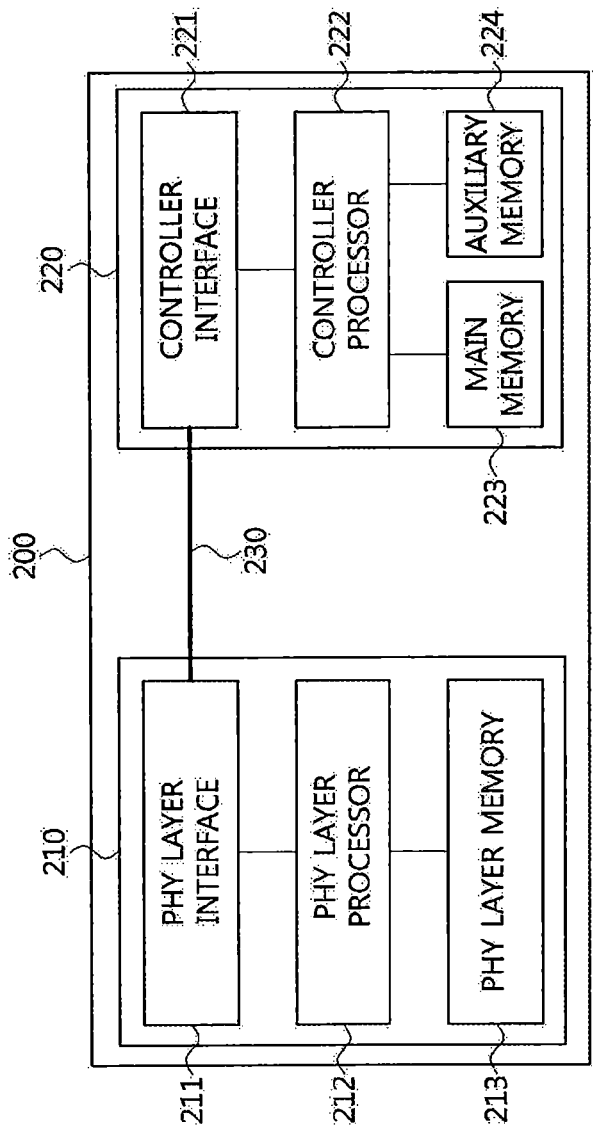
FIG. 2 is a block diagram illustrating a communication node belonging to a vehicle network according to a first exemplary embodiment of the present disclosure.

FIG. 2 is a block diagram illustrating a communication node belonging to a vehicle network according to a first exemplary embodiment of the present disclosure.

As shown in FIG. 2, a communication node 200 constituting a vehicle network may include a physical (PHY) layer unit 210 and a controller unit 220. The communication node 200 may further include a regulator (not shown) for supplying power. In particular, the controller unit 220 may be implemented to include a medium access control (MAC) layer. The PHY layer unit 210 may be configured to receive or transmit signals from or to another communication node. The controller unit 220 may be configured to control the PHY layer unit 210 and perform various functions (e.g., an infotainment function, or the like). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller unit 220 to the PHY layer processor 212 and transmit a signal received from the PHY layer processor 212 to the controller unit 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface 221, a controller processor 222, a main memory 223, and an auxiliary memory 224. The controller processor 222 is an electric circuitry which performs various functions described below. The configuration of the controller unit 220 is not limited thereto, and the controller unit 220 may be configured in various ways. The controller interface 221 may be configured to receive a signal from the PHY layer unit 210 (e.g., the PHY layer interface 211) or an upper layer (not shown), transmit the received signal to the controller processor 222, and transmit the signal received from the controller processor 222 to the PHY layer unit 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

The communication node 200 illustrated in FIG. 2 may be configured as follows.

Figure 3:
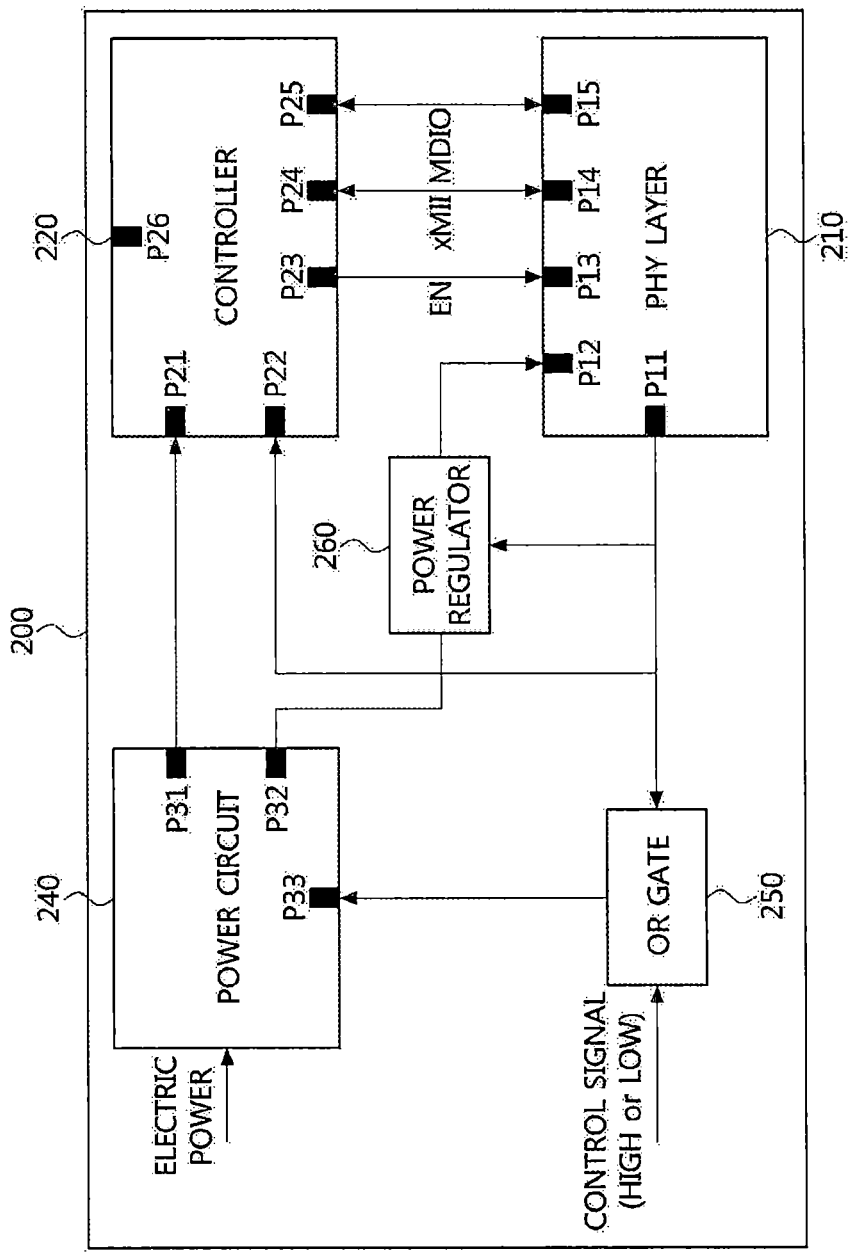
FIG. 3 is a block diagram illustrating a communication node belonging to a vehicle network according to a second exemplary embodiment of the present disclosure.

FIG. 3 is a block diagram illustrating a communication node belonging to a vehicle network according to a second exemplary embodiment of the present disclosure.

As shown in FIG. 3, the communication node 200 may comprise the PHY layer unit 210, the controller unit 220, a power circuit 240, an OR gate 250, a power regulator 260, and the like. Each of the PHY layer unit 210 and the controller unit 220 shown in FIG. 3 may be the same as or similar to the PHY layer unit 210 and the controller unit 220 shown in FIG. 2.

The PHY layer unit 210 may include a plurality of pins (e.g., P11, P12, P13, P14, and P15). The PHY layer unit 210 may output a signal for instructing power supply, a signal for instructing power-off, etc. through P11. For example, a HIGH signal output through P11 of the PHY layer unit 210 may indicate the power supply, and a LOW signal output through P11 of the PHY layer unit 210 may indicate the power-off. The P11 of the PHY layer unit 210 may denote an inhibit (INH) pin.

Alternatively, the PHY layer unit 210 may output an interrupt signal via P11. For example, a HIGH signal output through P11 of the PHY layer unit 210 may mean an interrupt signal, and the interrupt signal may be received at P22 of the controller unit 220. The interrupt signal may instruct transition from the sleep mode to the normal mode. Here, the P11 may denote an interrupt pin.

Electric power may be supplied from the power circuit 240 through P12 of the PHY layer unit 210. The PHY layer unit 210 may receive a signal instructing a transition from the sleep mode to the normal mode, a signal instructing a transition from the normal mode to the sleep mode, and the like via P13. For example, a HIGH signal input through P13 of the PHY layer unit 210 may instruct the transition from the sleep mode to the normal mode, and a LOW signal input through P13 of the PHY layer unit 210 may instruct the transition from the normal mode to the sleep mode. The P13 of the PHY layer unit 210 may denote an enable (EN) pin.

The P14 of PHY layer unit 210 may be used for xMII and the P15 of PHY layer unit 210 may be used for a management data input/output (MDIO) interface. For example, the PHY layer unit 210 may transmit and receive signals (e.g., Ethernet related signals) with the controller unit 220 using P14 and P15. The setting of each of the plurality of pins included in the PHY layer unit 210 is not limited to that described above, and each of the plurality of pins included in the PHY layer unit 210 may be variously configured.

The controller unit 220 may include a plurality of pins (e.g., P21, P22, P23, P24, P25, and P26). Electric power may be supplied from the power circuit 240 via P21 of the controller unit 220. The controller unit 220 may receive an interrupt signal via P22. For example, a HIGH signal input through P22 of the controller unit 220 may mean an interrupt signal. The controller unit 220 may transition from the sleep mode to the normal mode upon receiving the interrupt signal. The P22 of the controller unit 220 may denote an interrupt pin.

The controller unit 220 may output a signal instructing a transition from the sleep mode to the normal mode, a signal instructing a transition from the normal mode to the sleep mode, and the like via P23. For example, a HIGH signal output through P23 of the controller unit 220 may instruct the transition from the sleep mode to the normal mode, and a LOW signal output through the P23 of the controller unit 220 may instruct the transition from the normal mode to the sleep mode. The P23 of the controller unit 220 may denote the EN pin.

The P24 of the controller unit 220 may be used for xMII and the P25 of the controller unit 220 may be used for the MDIO interface. For example, the controller unit 220 may transmit and receive signals (e.g., Ethernet related signals) with the PHY layer unit 210 using P24 and P25. The controller unit 220 may detect a local wake-up signal (e.g., a local event) via P26. For example, a HGH signal input through P26 of the controller unit 220 may indicate a local wake-up signal. The P26 of the controller unit 220 may denote a WAKE pin. The setting of each of the plurality of pins included in the controller unit 220 is not limited to that described above, and each of the plurality of pins included in the controller unit 220 may be variously configured.

The power circuit 240 may include a plurality of pins (e.g., P31, P32, and P33). The power circuit 240 may receive a signal for instructing power supply, a signal for instructing power-off, and the like through P33. For example, a HIGH signal input via P33 of the power circuit 240 may indicate the power supply, and a LOW signal input from P33 of the power circuit 240 may indicate the power-off. The power circuit 240 may supply power based on the signal input through P33. For example, the power circuit 240 may supply power to the controller unit 220 via P31 and power to the PHY layer unit 210 via P32. The setting of each of the plurality of pins included in the power circuit 240 is not limited to that described above, and each of the plurality of pins included in the power circuit 240 may be variously configured.

The OR gate 250 may receive a control signal (e.g., a HIGH signal or a LOW signal) from an arbitrary entity (e.g., the controller unit 220), and a control signal (e.g., a HIGH signal or a LOW signal) from the PHY layer unit 210. The OR gate 250 may perform an OR operation on the control signals received from the arbitrary entity and the PHY layer unit 210, and may output a result of the OR operation. The result of the OR operation may be input to P33 of the power circuit 240.

An input end of the power regulator 260 may be connected to P32 of the power circuit 240 and an output end of the power regulator 260 may be connected to P12 of the PHY layer unit 210. When a voltage of the power supplied from the power circuit 240 exceeds a predetermined threshold value (e.g., 3.3 V), the power regulator 260 may regulate the voltage of the supplied power to the predetermined threshold value or less, and supply power having the regulated voltage to the PHY layer unit 210.

A protocol structure of the communication nodes illustrated in FIGS. 1 to 3 may be configured as follows.

Figure 4:
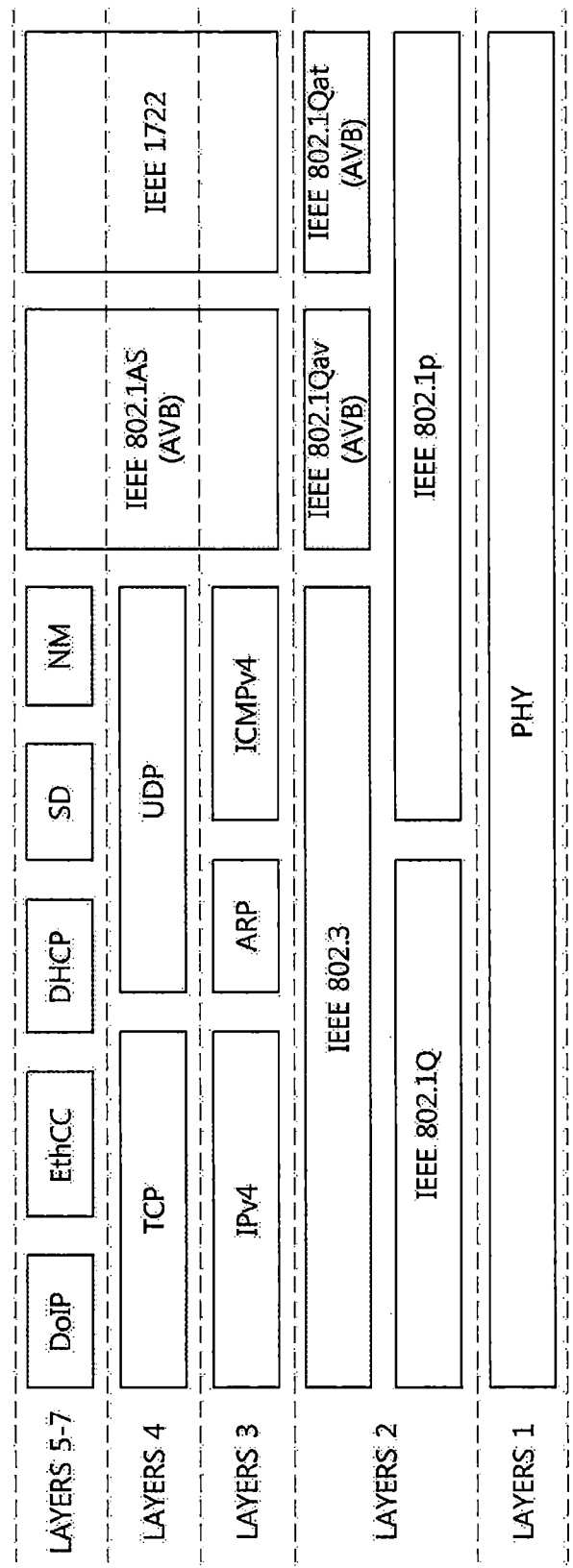
FIG. 4 is a block diagram illustrating a protocol structure of a communication node constituting a vehicle network according to an exemplary embodiment of the present disclosure.

FIG. 4 is a block diagram illustrating a protocol structure of a communication node constituting a vehicle network according to an exemplary embodiment of the present disclosure.

As shown in FIG. 4, a communication node may comprise layer 1 through layer 7. The layer 1 of the communication node may support the PHY functions and support a transmission rate of 100 megabits per second (Mbps). The layer 2 of the communication node may support IEEE 802.1Q protocol, IEEE 802.1p protocol, IEEE 802.3 protocol, audio video bridging (AVB) protocol (e.g., IEEE 802.1Qav protocol, IEEE 802.1Qat protocol), and the like. The layer 3 of the communication node may support internet protocol version 4 (IPv4), address resolution protocol (ARP), internet control message protocol version 4 (ICMPv4), IEEE 802.1AS, IEEE 1722, and the like. The layer 4 of the communication node may support transfer control protocol (TCP), user datagram protocol (UDP), IEEE 802.1AS, IEEE 1722, and the like. The layers 5 through 7 of the communication node may support diagnostics over internet protocol (DoIP), EthCC protocol, dynamic host configuration protocol (DHCP), SD protocol, network management (NM) protocol, IEEE 802.1AS, IEEE 1722, and the like.

The communication node described above may operate in a sleep mode or an active mode. In the sleep mode, the PHY layer unit of the communication node may be an enabled state (i.e., ON state), and the controller unit of the communication node may be a disabled state (i.e., OFF state). Alternatively, in the sleep mode, the PHY layer unit and the controller unit of the communication node may be in the disabled state (i.e., OFF state). In the active mode, the PHY layer unit and the controller unit of the communication node may be enabled. That is, the active mode may indicate a state in which the communication node has waked up. When a wake-up signal is received or when a specific event is detected, the operation mode of the communication node may transition from the sleep mode to the active mode.

Figure 5:
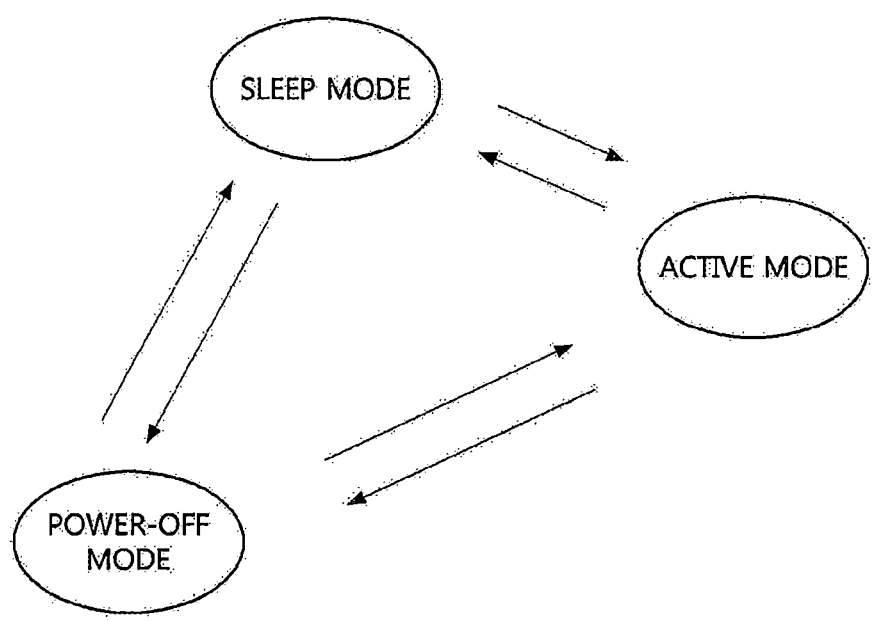
FIG. 5 is a conceptual diagram illustrating operation modes of a communication node.

FIG. 5 is a conceptual diagram illustrating operation modes of a communication node.

As shown in FIG. 5, the communication node may basically be in the power-off mode, and may transition from the power-off mode to the sleep mode or the active mode if necessary. The communication node operating in the sleep mode may transition to the power-off mode or the active mode, and the communication node operating in the active mode may transition to the power-off mode or the sleep mode. In the power-off mode, both the PHY layer unit (i.e., the PHY layer unit 210 described with reference to FIG. 2) and the controller unit (i.e., the controller unit 220 described with reference to FIG. 2) included in the communication node may maintain the OFF state. In the sleep mode, the PHY layer unit included in the communication node may wake up and operate in the ON state, and the controller unit included in the communication node may maintain the OFF state. In the active mode, the PHY layer unit and the controller unit included in the communication node may all wake up and operate in the ON state.

Hereinafter, selective wake-up methods in a vehicle network will be described. Hereinafter, even when a method (e.g., transmission or reception of a signal) to be performed at a first communication node is described, a corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

Figure 6:
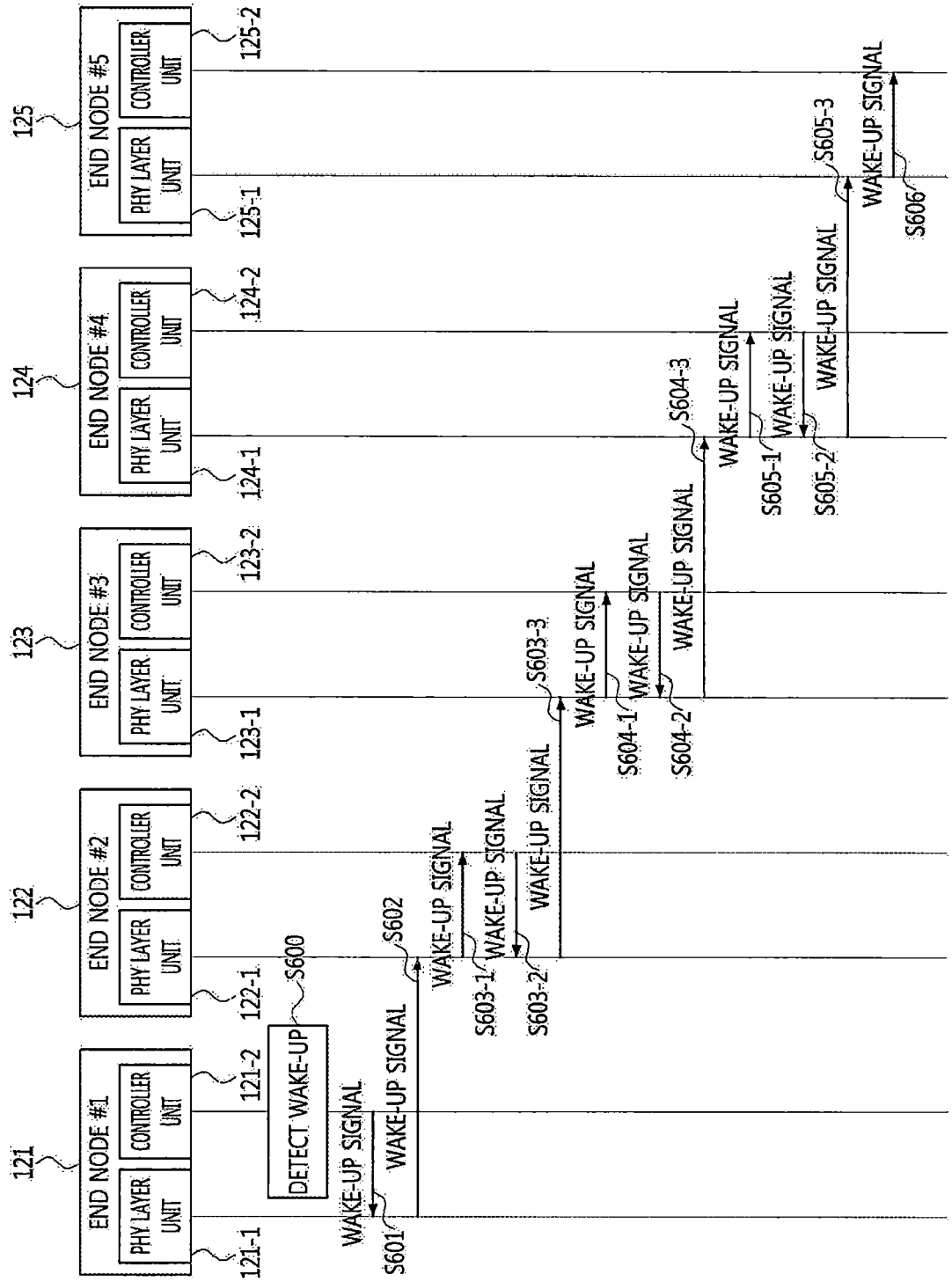
FIG. 6 is a sequence chart illustrating an operation method of a communication node connected in a daisy chain scheme in a vehicle network according to a first exemplary embodiment of the present disclosure.

FIG. 6 is a sequence chart illustrating an operation method of a communication node connected in a daisy chain scheme in a vehicle network according to a first exemplary embodiment of the present disclosure.

As shown in FIG. 6, a first end node 121, a second end node 122, a third end node 123, a fourth end node 124, and a fifth end node 125 may be connected in a daisy chain scheme. For example, the end node 121 may be connected to the end node 122, the end node 122 may be connected to the end node 123, the end node 123 may be connected to the end node 124, and the end node 124 may be connected to the end node 125.

Each of the end nodes 121, 122, 123, 124, and 125 may perform the same or similar functions as the end node shown in FIG. 1. Each of the end nodes 121, 122, 123, 124, and 125 may be configured to be the same as or similar to the communication node shown in FIGS. 2 to 4. The PHY layer units 121-1, 122-1, 123-1, 124-1, and 125-1 and the controller units 121-2, 122-1, 123-2, 124-2, and 125-2 included in the end nodes 121, 122, 123, 124, and 125 may be the same as or similar to the PHY layer unit 210 and the controller unit 220 shown in FIGS. 2 and 3.

The end node 121 may operate in the sleep mode and may detect an event (e.g., a local event) (S600). When an event is detected, the operation mode of the end node 121 may transition from the sleep mode to the active mode. That is, the end node 121 may be woken up. Specifically, the controller unit 121-2 of the end node 121 may detect a local event through the P26 shown in FIG. 3 or a power circuit of the end node 121 (e.g., the power circuit 240 shown in FIG. 3). When a local event is detected, the operation state of the controller unit 121-2 may transition from OFF state to ON state. The controller unit 121-2 operating in ON state may transmit a signal (e.g., a transition request signal) instructing to transition from OFF state to ON state to the PHY layer unit 121-1 through the P23 shown in FIG. 3 (S601). Upon receiving the transition request signal through the P13 show in FIG. 3, the operation state of the PHY layer unit 121-1 may transition from OFF state to ON state.

In addition to the transmission of the transition request signal, the end node 121 may transmit a wake-up signal (S602). For example, the end node 121 may identify a wake-up reason (e.g., a reason of event occurrence), and when it is determined that the end node 121 needs to wake up another end node, the end node 121 may transmit a wake-up signal. The wake-up signal may be transmitted in a broadcasting manner. The wake-up reason may be as follows.

Door operation (e.g., door opening, door closing)
Telematics operation (e.g., remote start)
Media operation
Power state change (e.g., ACC, IGN)
Theft detection
Reserved operation (e.g., charging operation, software update operation)

The end node 122 may receive the wake-up signal from the end node 121 through the PHY layer unit 122-1, and when the wake-up signal is received, the operation state of the PHY layer unit 122-1 may transition from OFF state to ON state. The PHY layer unit 122-1 operating in ON state may transmit the wake-up signal to the controller unit 122-2 (S603-1). When the wake-up signal is received, the operation state of the controller unit 122-2 may transition from OFF state to ON state. The controller unit 122-2 operating in ON state may identify information included in the wake-up signal (e.g., the wake-up reason). When it is determined that the end node 122 needs to operate in the active mode based on the wake-up reason, the operation state of the controller unit 122-2 may be maintained in ON state. On the other hand, when it is determined that the end node 122 does not need to operate in the active mode based on the wake-up reason, the operation state of the controller unit 122-2 may transition from ON state to OFF state.

The controller unit 122-2 may transmit a wake-up signal to the PHY layer unit 122-1 (S603-2). The wake-up signal transmitted in the step S603-2 may be a wake-up signal reconfigured by the controller unit 122-2. Then, the end node 122 may transmit the wake-up signal to the end node 123 (S603-3).

The end node 123 may receive the wake-up signal from the end node 122 through the PHY layer unit 123-1, and when the wake-up signal is received, the operation state of the PHY layer unit 123-1 may transition from OFF state to ON state. The PHY layer unit 123-1 operating in ON state may transmit the wake-up signal to the controller unit 123-2 (S604-1). When the wake-up signal is received, the operation state of the controller unit 123-2 may transition from OFF state to ON state. The controller unit 123-2 operating in ON state may identify information included in the wake-up signal (e.g., the wake-up reason). When it is determined that the end node 123 needs to operate in the active mode based on the wake-up reason, the operation state of the controller unit 123-2 may be maintained in ON state. On the other hand, when it is determined that the end node 123 does not need to operate in the active mode based on the wake-up reason, the operation state of the controller unit 123-2 may transition from ON state to OFF state.

The controller unit 123-2 may transmit a wake-up signal to the PHY layer unit 123-1 (S604-2). The wake-up signal transmitted in the step S604-2 may be a wake-up signal reconfigured by the controller unit 123-2. Then, the end node 123 may transmit the wake-up signal to the end node 124 (S604-3).

The end node 124 may receive the wake-up signal from the end node 123 through the PHY layer unit 124-1, and when the wake-up signal is received, the operation state of the PHY layer unit 124-1 may transition from OFF state to ON state. The PHY layer unit 124-1 operating in ON state may transmit the wake-up signal to the controller unit 124-2 (S605-1). When the wake-up signal is received, the operation state of the controller unit 124-2 may transition from OFF state to ON state. The controller unit 124-2 operating in ON state may identify information included in the wake-up signal (e.g., the wake-up reason). When it is determined that the end node 124 needs to operate in the active mode based on the wake-up reason, the operation state of the controller unit 124-2 may be maintained in ON state. On the other hand, when it is determined that the end node 124 does not need to operate in the active mode based on the wake-up reason, the operation state of the controller unit 124-2 may transition from ON state to OFF state.

The controller unit 124-2 may transmit a wake-up signal to the PHY layer unit 124-1 (S605-2). The wake-up signal transmitted in the step S605-2 may be a wake-up signal reconfigured by the controller unit 124-2. Then, the end node 124 may transmit the wake-up signal to the end node 125 (S605-3).

The end node 125 may receive the wake-up signal from the end node 124 through the PHY layer unit 125-1, and when the wake-up signal is received, the operation state of the PHY layer unit 125-1 may transition from OFF state to ON state. The PHY layer unit 125-1 operating in ON state may transmit the wake-up signal to the controller unit 125-2 (S606). When the wake-up signal is received, the operation state of the controller unit 125-2 may transition from OFF state to ON state. The controller unit 125-2 operating in ON state may identify information included in the wake-up signal (e.g., the wake-up reason). When it is determined that the end node 125 needs to operate in the active mode based on the wake-up reason, the operation state of the controller unit 125-2 may be maintained in ON state. On the other hand, when it is determined that the end node 125 does not need to operate in the active mode based on the wake-up reason, the operation state of the controller unit 125-2 may transition from ON state to OFF state.

In the above-described operation method of the end nodes, since the wake-up signal is transmitted to the controller units of all the end nodes irrespective of the wake-up reason (e.g., local event occurrence), the controller units of the end nodes that are not the wake-up target (e.g., target end node) may also be woken up. Next, a selective wake-up method for communication nodes connected in a daisy chain scheme in a vehicle network will be described.

Figure 7:
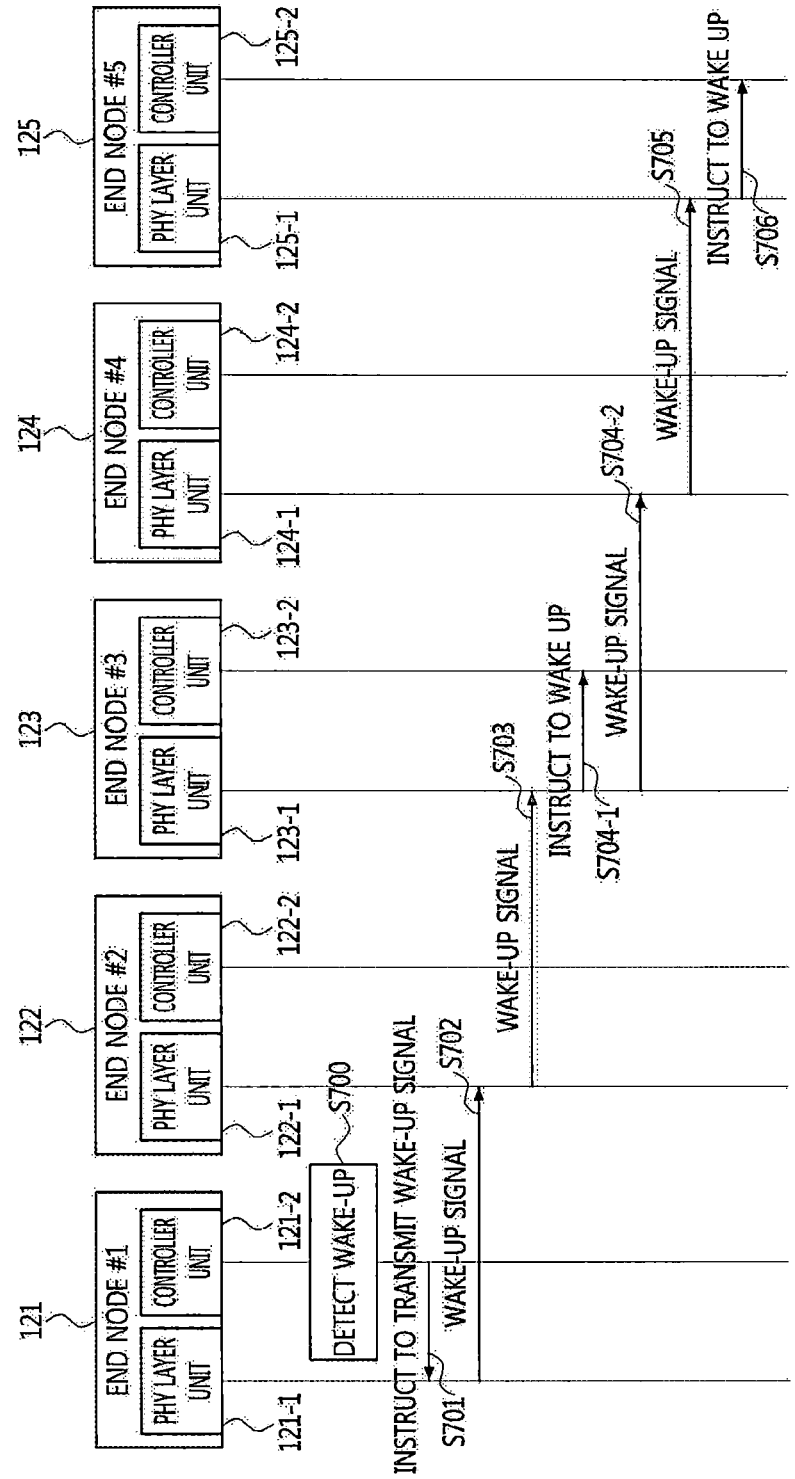
FIG. 7 is a sequence chart illustrating an operation method of a communication node connected in a daisy chain scheme in a vehicle network according to a second exemplary embodiment of the present disclosure.

FIG. 7 is a sequence chart illustrating an operation method of a communication node connected in a daisy chain scheme in a vehicle network according to a second exemplary embodiment of the present disclosure.

As shown in FIG. 7, a vehicle network of FIG. 7 may be the same as or similar to the vehicle network shown in FIG. 6. The vehicle network may comprise the end node 121, the end node 122, the end node 123, the end node 124, the end node 125, and the like. Each of the end nodes 121, 122, 123, 124, and 125 may perform the same or similar functions as the end node shown in FIG. 1. Each of the end nodes 121, 122, 123, 124, and 125 may be configured to be the same as or similar to the communication node shown in FIGS. 2 to 4. Each of the end nodes 121, 122, 123, 124, and 125 may include each of the PHY layer units 121-1, 122-1, 123-1, 124-1, and 125-1, and the controller units 121-2, 122-2, 123-2, 124-2, and 125-2. Each of the PHY layer units 121-1, 122-1, 123-1, 124-1, and 125-1 and the controller units 121-2, 122-1, 123-2, 124-2, and 125-2 included in the end nodes 121, 122, 123, 124, and 125 may be the same as or similar to the PHY layer unit 210 and the controller unit 220 shown in FIGS. 2 and 3.

The end node 121 may operate in the sleep mode and may detect an event (e.g., a local event) (S700). When an event is detected, the operation mode of the end node 121 may transition from the sleep mode to the active mode. That is, the end node 121 may be woken up. Specifically, the controller unit 121-2 of the end node 121 may detect a local event through the P26 shown in FIG. 3 or a power circuit of the end node 121 (e.g., the power circuit 240 shown in FIG. 3). When a local event is detected, the operation state of the controller unit 121-2 may transition from OFF state to ON state. The controller unit 121-2 operating in ON may transmit a signal (e.g., a transition request signal) instructing to transition from OFF state to ON state to the PHY layer unit 121-1 through the P23 shown in FIG. 3. Upon receiving the transition request signal through the P13 show in FIG. 3, the operation state of the PHY layer unit 121-1 may transition from OFF state to ON state.

In addition to the transmission of the transition request signal, the controller unit 121-2 may instruct the PHY layer unit 121-1 to transmit a wake-up signal (S701). For example, the controller unit 121-2 may identify a wake-up reason (e.g., a reason of event occurrence), and when it is determined to be necessary to wake up another end node, the controller unit 121-2 may transmit to the PHY layer unit 121-1 an indicator instructing to transmit a wake-up signal. When it is required to wake up the end node 121, the end node 123, and the end node 125 according to the event occurrence, the controller unit 121-2 may transmit to the PHY layer unit 121-1 an indicator requesting to transmit a wake-up signal for waking up the end node 121, the end node 123, and the end node 125. The operation state of the controller unit 121-2 may be maintained in ON state.

The PHY layer unit 121-1 may receive the indicator requesting to transmit a wake-up signal. Upon receiving the indicator, the PHY layer unit 121-1 may generate a wake-up signal including identifiers indicating the end nodes required to be woken up (e.g., the end node 121, the end node 123, and the end node 125).

The identifier indicating the end node may be a global identifier (ID) used to uniquely identify a specific end node within the vehicle network, or may be a local ID used to uniquely identify a specific end node within a specific region within the vehicle network.

The identifier indicating the end node may be a group ID indicating a plurality of end nodes for which wake-up is requested by the local event. For example, when all of the end node 121, the end node 123, and the end node 125 always operate together in response to the local event, the end node 121, the end node 123, and the end node 125 may be configured with the same group ID. For the local event, if any one of the end nodes 121, 123 and 125 is in the active mode, the other end nodes may be always in the active mode, and if any one of the end nodes 121, 123 and 125 is in the sleep mode, the other end nodes may be always in the sleep mode.

The identifier may be stored in an internal memory (e.g., the PHY layer memory 213 of FIG. 2) of the PHY layer units 121-1, 122-1, 123-1, 124-1, and 125-1, or in an external memory of the PHY layer units 121-1, 122-1, 123-1, 124-1, and 125-1. Alternatively, the identifier may be configured using general purpose input/output (GPIO) pins, analog pins, or a PHY register in the PHY layer units 121-1, 122-1, 123-1, 124-1, and 125-1.

The wake-up signal may be a PHY layer signal (e.g., an in-band signal). Here, the identifier indicating the end nodes required to be woken up may be included in a preamble field of a PHY header. Thus, the identifier included in the wake-up signal may be interpreted by the PHY layer units 121-1, 122-1, 123-1, 124-1, and 125-1. Since the PHY layer units 121-1, 122-1, 123-1, 124-1, and 125-1 are able to interpret the identifier included in the wake-up signal, even when the PHY layer units 121-1, 122-1, 123-1, 124-1, and 125-1 do not transfer the wake-up signal to the controller units 121-2, 122-2, 123-2, 124-2, and 125-2, the end nodes 121, 122, 123, 124, and 125 may identify the end nodes required to be woken up.

The PHY layer unit 121-1 may transmit the wake-up signal to the end node 122 (S702). The PHY layer unit 122-1 may receive the wake-up signal, and may identify the identifier included in the wake-up signal upon receipt of the wake-up signal. When the identifier included in the wake-up signal is different from its identifier, the PHY layer unit 122-1 may transmit the wake-up signal to the end node 123 without transmitting the wake-up signal to the controller unit 122-2 (S703).

The PHY layer unit 123-1 may receive the wake-up signal, and may identify the identifier included in the wake-up signal upon receipt of the wake-up signal. When the identifier included in the wake-up signal is the same as its identifier, the PHY layer unit 123-1 may transition the operation state of the controller unit 123-2 from OFF state to ON state (S704-1). When the controller unit 123-2 detects a local event, the controller unit 123-2 may identify end nodes required to be woken up based on the local event. The controller unit 123-2 may transmit to the PHY layer unit 123-1 identifiers indicating the end nodes required to be woken up based on the local event. The PHY layer unit 123-1 may generate a wake-up signal including the identifiers included in the received wake-up signal and the identifiers indicating the end nodes required to be woken up based on the local event. The PHY layer unit 123-1 may transmit the generated wake-up signal to the end node 124 (S704-2).

The PHY layer unit 124-1 may receive the wake-up signal, and may identify the identifier included in the wake-up signal upon receipt of the wake-up signal. When the identifier included in the wake-up signal is different from its identifier, the PHY layer unit 124-1 may transmit the wake-up signal to the end node 125 without transmitting the wake-up signal to the controller unit 124-2 (S705).

The PHY layer unit 125-1 may receive the wake-up signal, and may identify the identifier included in the wake-up signal upon receipt of the wake-up signal. When the identifier included in the wake-up signal is the same as its identifier, the PHY layer unit 125-1 may transition the operation state of the controller unit 125-2 from OFF state to ON state (S706).

Next, methods for waking up another communication node required to be woken up even without occurrence of a local event will be described. The embodiment of FIG. 8 describes operations of the end nodes 121, 123, and 125 after the end nodes 121, 123, and 125 are woken up according to the embodiment of FIG. 7. That is, according to the occurrence of the local event, the end nodes 121, 123, and 125 are woken up and in the active mode, and the end nodes 122 and 124 are in the sleep mode. In this case, operations of the end nodes will be described.

Figure 8:
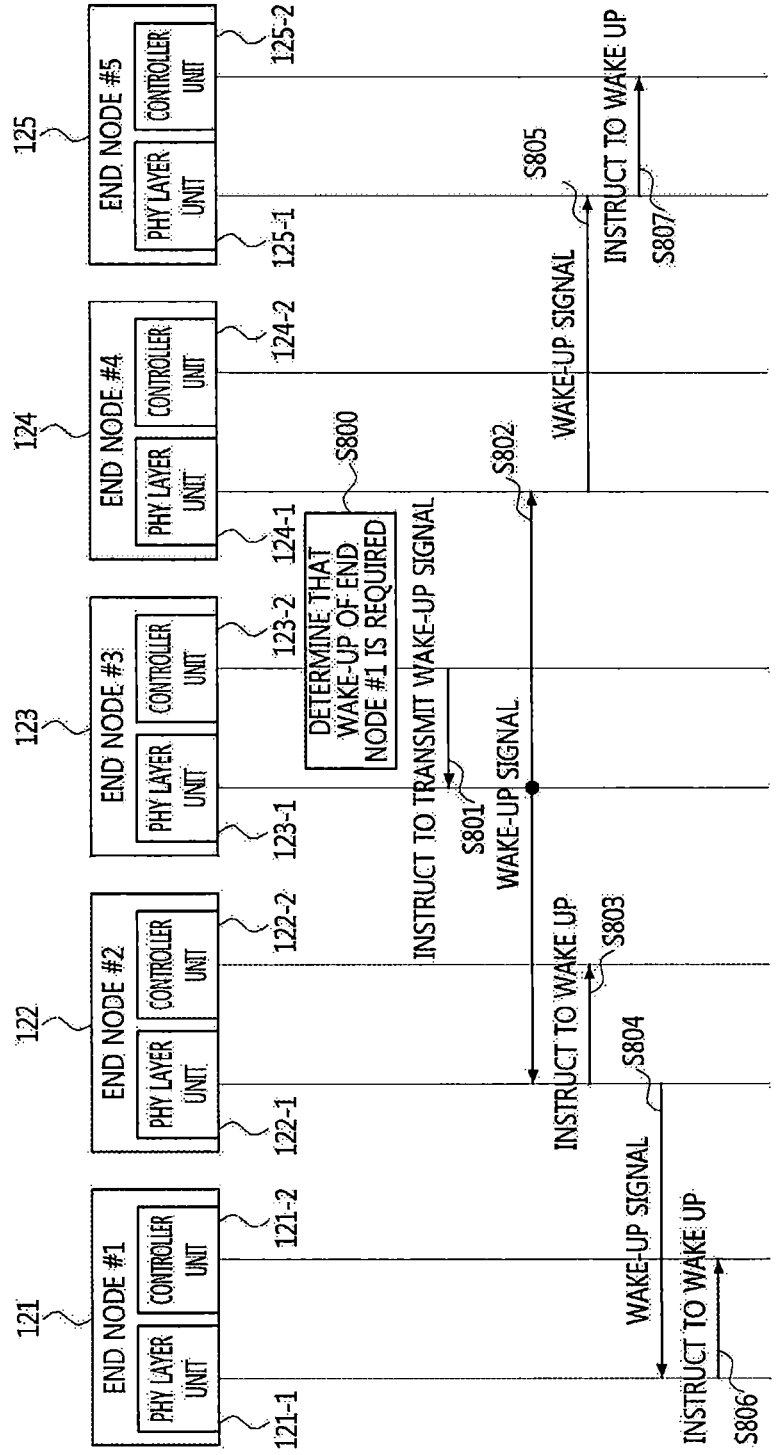
FIG. 8 is a sequence chart illustrating an operation method of a communication node connected in a daisy chain scheme in a vehicle network according to a third exemplary embodiment of the present disclosure.

FIG. 8 is a sequence chart illustrating an operation method of a communication node connected in a daisy chain scheme in a vehicle network according to a third exemplary embodiment of the present disclosure.

As shown in FIG. 8, a vehicle network of FIG. 8 may be the same as or similar to the vehicle network shown in FIG. 6. The vehicle network may comprise the end node 121, the end node 122, the end node 123, the end node 124, the end node 125, and the like. Each of the end nodes 121, 122, 123, 124, and 125 may perform the same or similar functions as the end node shown in FIG. 1. Each of the end nodes 121, 122, 123, 124, and 125 may be configured to be the same as or similar to the communication node shown in FIGS. 2 to 4. Each of the end nodes 121, 122, 123, 124, and 125 may include each of the PHY layer units 121-1, 122-1, 123-1, 124-1, and 125-1, and the controller units 121-2, 122-2, 123-2, 124-2, and 125-2. Each of the PHY layer units 121-1, 122-1, 123-1, 124-1, and 125-1 and the controller units 121-2, 122-1, 123-2, 124-2, and 125-2 included in the end nodes 121, 122, 123, 124, and 125 may be the same as or similar to the PHY layer unit 210 and the controller unit 220 shown in FIGS. 2 and 3.

The end node 123 operating in the active mode may determine that another end node (e.g., the end node 122) is required to be woken up (S800). For example, the end node 123 may identify end nodes required to be woken up based on the wake-up signal received in the step S703 of FIG. 7. Alternatively, the end node 123 may detect a local event, and based on the detected local event, the end node 123 may identify the end nodes required to be woken up. The controller unit 123-2 may transmit to the PHY layer unit 123-1 an indicator requesting to transmit a wake-up signal for waking up the end nodes required to be woken up (e.g., the end node 122) (S801).

The PHY layer unit 123-1 may receive the indicator requesting to transmit the wake-up signal. Upon receipt of the indicator, the PHY layer unit 123-1 may generate a wake-up signal that further includes the identifiers of the end node required to be woken up (e.g., the identifier of the end node 122). That is, the PHY layer unit 123-1 may generate a wake-up signal including the identifiers of the end nodes 121, 122, 123, and 125.

The identifier indicating the end node may be a global identifier (ID) used to uniquely identify a specific end node within the vehicle network, or may be a local ID used to uniquely identify a specific end node within a specific region within the vehicle network.

The identifier indicating the end node may be a group ID indicating a plurality of end nodes for which wake-up is requested by the local event. For example, when all of the end node 121, the end node 122, the end node 123, and the end node 125 always operate together in response to the local event, the end node 121, the end node 122, the end node 123, and the end node 125 may be configured with the same group ID. For the local event, if any one of the end nodes 121, 122, 123 and 125 is in the active mode, the other end nodes may be always in the active mode, and if any one of the end nodes 121, 122, 123 and 125 is in the sleep mode, the other end nodes may be always in the sleep mode.

The identifier may be stored in an internal memory (e.g., the PHY layer memory 213 of FIG. 2) of the PHY layer units 121-1, 122-1, 123-1, 124-1, and 125-1, or in an external memory of the PHY layer units 121-1, 122-1, 123-1, 124-1, and 125-1. Alternatively, the identifier may be configured using general purpose input/output (GPIO) pins, analog pins, or a PHY register in the PHY layer units 121-1, 122-1, 123-1, 124-1, and 125-1.

The wake-up signal may be a PHY layer signal (e.g., an in-band signal). Here, the identifier indicating the end nodes required to be woken up may be included in a preamble field of a PHY header. Thus, the identifier included in the wake-up signal may be interpreted by the PHY layer units 121-1, 122-1, 123-1, 124-1, and 125-1. Since the PHY layer units 121-1, 122-1, 123-1, 124-1, and 125-1 are able to interpret the identifier included in the wake-up signal, even when the PHY layer units 121-1, 122-1, 123-1, 124-1, and 125-1 do not transfer the wake-up signal to the controller units 121-2, 122-2, 123-2, 124-2, and 125-2, the end nodes 121, 122, 123, 124, and 125 may identify the end nodes required to be woken up.

The PHY layer unit 123-1 may transmit the wake-up signal in a broadcasting manner (S802). The PHY layer unit 122-1 may receive the wake-up signal, and may identify the identifier included in the wake-up signal upon receipt of the wake-up signal. When the identifier included in the wake-up signal is the same as its identifier, the PHY layer unit 122-1 may transition the operation state of the controller unit 122-2 from OFF state to ON state (S803). When the controller unit 122-2 detects a local event, the controller unit 122-2 may identify end nodes required to be woken up based on the local event. The controller unit 122-2 may transmit to the PHY layer unit 122-1 the identifiers indicating the end nodes required to be woken up based on the local event. The PHY layer unit 122-1 may generate a wake-up signal including the identifiers included in the received wake-up signal and the identifiers indicating the end nodes required to be woken up based on the local event. The PHY layer unit 122-1 may transmit the generated wake-up signal to the end node 121 (S804).

The PHY layer unit 124-1 may receive the wake-up signal, and may identify the identifier included in the wake-up signal upon receipt of the wake-up signal. When the identifier included in the wake-up signal is different from its identifier, the PHY layer unit 124-1 may transmit the wake-up signal to the end node 125 without transmitting the wake-up signal to the controller unit 124-2 (S805).

The PHY layer unit 121-1 may receive the wake-up signal, and may identify the identifier included in the wake-up signal upon receipt of the wake-up signal. When the identifier included in the wake-up signal is the same as its identifier, the PHY layer unit 121-1 may transition the operation state of the controller unit 121-2 from OFF state to ON state (S806).

The PHY layer unit 125-1 may receive the wake-up signal, and may identify the identifier included in the wake-up signal upon receipt of the wake-up signal. When the identifier included in the wake-up signal is the same as its identifier, the PHY layer unit 125-1 may transition the operation state of the controller unit 125-2 from OFF state to ON state (S807).

Next, methods for transitioning other communication nodes that are not required to operate to the sleep mode will be described. The embodiment of FIG. 9 describes operations of the end nodes 121, 122, 123, and 125 after the end nodes 121, 122, 123, and 125 are woken up according to the embodiment of FIG. 8. That is, according to the wake-up signal, the end nodes 121, 122, 123, and 125 are woken up and in the active mode, and the end node 124 is in the sleep mode. In this case, operations of the end nodes will be described.

FIG. 9 is a sequence chart illustrating an operation method of a communication node connected in a daisy chain scheme in a vehicle network according to a fourth exemplary embodiment of the present disclosure.

As shown in FIG. 9, a vehicle network of FIG. 9 may be the same as or similar to the vehicle network shown in FIG. 6. The vehicle network may comprise the end node 121, the end node 122, the end node 123, the end node 124, the end node 125, and the like. Each of the end nodes 121, 122, 123, 124, and 125 may perform the same or similar functions as the end node shown in FIG. 1. Each of the end nodes 121, 122, 123, 124, and 125 may be configured to be the same as or similar to the communication node shown in FIGS. 2 to 4. Each of the end nodes 121, 122, 123, 124, and 125 may include each of the PHY layer units 121-1, 122-1, 123-1, 124-1, and 125-1, and the controller units 121-2, 122-2, 123-2, 124-2, and 125-2. Each of the PHY layer units 121-1, 122-1, 123-1, 124-1, and 125-1 and the controller units 121-2, 122-1, 123-2, 124-2, and 125-2 included in the end nodes 121, 122, 123, 124, and 125 may be the same as or similar to the PHY layer unit 210 and the controller unit 220 shown in FIGS. 2 and 3.

The end node 123 operating in the active mode may determine that another end node (e.g., the end node 121) operating in the active mode is required to transition to the sleep mode (S900). For example, the controller 123-2 may identify end nodes required to transition to the sleep mode based on a wake-up reason. The controller unit 123-2 may transmit to the PHY layer unit 123-1 an indicator requesting to transmit a sleep request signal for transitioning another communication node (e.g., the end node 121) required to transition to the sleep mode (S901).

The PHY layer unit 123-1 may receive the indicator requesting to transmit a sleep request signal. Upon receipt of the indicator, the PHY layer unit 123-1 may generate a sleep request signal including the identifiers of the end nodes required to transition to the sleep mode (e.g., the identifier of the end node 121).

The identifier indicating the end node may be a global ID used to uniquely identify a specific end node within the vehicle network, or may be a local ID used to uniquely identify a specific end node within a specific region within the vehicle network.

In addition, the identifier indicating the end node may be a group ID indicating a plurality of end nodes required to transition to the sleep mode. For example, when all of the end node 122, the end node 123, and the end node 125 always operate together in response to the sleep request, the end node 122, the end node 123, and the end node 125 may be configured with the same group ID. For the sleep request, if any one of the end nodes 122, 123 and 125 is in the active mode, the other end nodes may be always in the active mode, and if any one of the end nodes 122, 123 and 125 is in the sleep mode, the other end nodes may be always in the sleep mode.

The identifier may be stored in an internal memory (e.g., the PHY layer memory 213 of FIG. 2) of the PHY layer units 121-1, 122-1, 123-1, 124-1, and 125-1, or in an external memory of the PHY layer units 121-1, 122-1, 123-1, 124-1, and 125-1. Alternatively, the identifier may be configured using GPIO pins, analog pins, or a PHY register in the PHY layer units 121-1, 122-1, 123-1, 124-1, and 125-1.

The sleep request signal may be a PHY layer signal (e.g., an in-band signal). Here, the identifier indicating the end nodes required to transition to the sleep mode may be included in a preamble field of a PHY header. Thus, the identifier included in the sleep request signal may be interpreted by the PHY layer units 121-1, 122-1, 123-1, 124-1, and 125-1. Since the PHY layer units 121-1, 122-1, 123-1, 124-1, and 125-1 are able to interpret the identifier included in the sleep request signal, even when the PHY layer units 121-1, 122-1, 123-1, 124-1, and 125-1 do not transfer the sleep request signal to the controller units 121-2, 122-2, 123-2, 124-2, and 125-2, the end nodes 121, 122, 123, 124, and 125 may identify the end nodes required to transition to the sleep mode.

The PHY layer unit 123-1 may transmit the sleep request signal in a broadcasting manner (S902). The PHY layer unit 122-1 may receive the sleep request signal, and may identify the identifier included in the sleep request signal upon receipt of the sleep request signal. When the identifier included in the sleep request signal is different from its identifier, the PHY layer unit 122-1 may transmit the sleep request signal to the end node 121 without transmitting the sleep request signal to the controller unit 122-2 (S903). Thus, the PHY layer unit 122-1 may not wake up the controller unit 122-2.

The PHY layer unit 124-1 may receive the sleep request signal, and may identify the identifier included in the sleep request signal upon receipt of the sleep request signal. When the identifier included in the sleep request signal is different from its identifier, the PHY layer unit 124-1 may transmit the sleep request signal to the end node 125 without transmitting the sleep request signal to the controller unit 124-2 (S904). Thus, the PHY layer unit 124-1 may not wake up the controller unit 124-2.

The PHY layer unit 125-1 may receive the sleep request signal, and may identify the identifier included in the sleep request signal upon receipt of the sleep request signal. When the identifier included in the sleep request signal is different from its identifier, the PHY layer unit 125-1 may not wake up the controller unit 125-2.

The PHY layer unit 121-1 may receive the sleep request signal, and may identify the identifier included in the sleep request signal upon receipt of the sleep request signal. When the identifier included in the sleep request signal is the same as its identifier, the PHY layer unit 121-1 may transition the operation state of the controller unit 121-2 from ON state to OFF state by transmitting an indicator requesting to transition to ON state (S905).

Upon receipt of the indicating requesting to transition the operation state from ON state to OFF state, the controller unit 121-2 may transmit to the PHY layer unit 121-1 an indicator requesting to transmit a sleep response signal (S906). Then, the operation state of the controller 121-2 may transition from ON state to OFF state.

Upon receipt of the indicator, the PHY layer unit 121-1 may transmit a sleep response signal indicating that the operation state of the controller unit 121-1 has transitioned from ON state to OFF state (S907). The sleep response signal may include the identifier of the end node having transitioned from the active mode to the sleep mode (e.g., the identifier of the end node 121).

The identifier indicating the end node may be a global ID used to uniquely identify a specific end node within the vehicle network, or may be a local ID used to uniquely identify a specific end node within a specific region within the vehicle network.

The identifier may be stored in an internal memory (e.g., the PHY layer memory 213 of FIG. 2) of the PHY layer units 121-1, 122-1, 123-1, 124-1, and 125-1, or in an external memory of the PHY layer units 121-1, 122-1, 123-1, 124-1, and 125-1. Alternatively, the identifier may be configured using GPIO pins, analog pins, or a PHY register in the PHY layer units 121-1, 122-1, 123-1, 124-1, and 125-1.

The sleep response signal may be a PHY layer signal (e.g., an in-band signal). Here, the identifier indicating the end nodes having transitioned to the sleep mode may be included in a preamble field of a PHY header. Thus, the identifier included in the sleep response signal may be interpreted by the PHY layer units 121-1, 122-1, 123-1, 124-1, and 125-1. Since the PHY layer units 121-1, 122-1, 123-1, 124-1, and 125-1 are able to interpret the identifier included in the sleep response signal, even when the PHY layer units 121-1, 122-1, 123-1, 124-1, and 125-1 do not transfer the sleep response signal to the controller units 121-2, 122-2, 123-2, 124-2, and 125-2, the end nodes 121, 122, 123, 124, and 125 may identify the end nodes having transitioned to the sleep mode.

The PHY layer unit 122-1 may receive the sleep response signal, and upon receipt of the sleep response signal, the PHY layer unit 122-1 may determine whether or not the identifier included in the sleep request signal is the same as the identifier included in the sleep response signal. When the identifier included in the sleep request signal is the same as the identifier included in the sleep response signal, the PHY layer unit 122-1 may determine that the end node indicated by the identifier included in the sleep response signal operates in the sleep mode, and transmit the sleep response signal to the end node 123 (S908). When the identifier included in the sleep request signal is different from the identifier included in the sleep response signal, or when the sleep response signal is not received within a preconfigured time, the sleep request signal may be retransmitted. That is, the sleep request signal including the identifiers of the end nodes required to transition to the sleep mode (e.g., the end node 121) may be retransmitted in a broadcasting manner.

The PHY layer unit 123-1 may receive the sleep response signal, and upon receipt of the sleep response signal, the PHY layer unit 123-1 may determine whether or not the identifier included in the sleep request signal is the same as the identifier included in the sleep response signal. When the identifier included in the sleep request signal is the same as the identifier included in the sleep response signal, the PHY layer unit 123-1 may determine that the end node indicated by the identifier included in the sleep response signal operates in the sleep mode, and transmit the sleep response signal to the end node 124 (S909). When the identifier included in the sleep request signal is different from the identifier included in the sleep response signal, or when the sleep response signal is not received within a preconfigured time, the sleep request signal may be retransmitted. That is, the sleep request signal including the identifiers of the end nodes required to transition to the sleep mode may be retransmitted in a broadcasting manner.

The PHY layer unit 124-1 may receive the sleep response signal, and upon receipt of the sleep response signal, the PHY layer unit 124-1 may determine whether or not the identifier included in the sleep request signal is the same as the identifier included in the sleep response signal. When the identifier included in the sleep request signal is the same as the identifier included in the sleep response signal, the PHY layer unit 124-1 may determine that the end node indicated by the identifier included in the sleep response signal operates in the sleep mode, and transmit the sleep response signal to the end node 125 (S910). When the identifier included in the sleep request signal is different from the identifier included in the sleep response signal, or when the sleep response signal is not received within a preconfigured time, the sleep request signal may be retransmitted. That is, the sleep request signal including the identifiers of the end nodes required to transition to the sleep mode may be retransmitted in a broadcasting manner.

The PHY layer unit 125-1 may receive the sleep response signal, and upon receipt of the sleep response signal, the PHY layer unit 125-1 may determine whether or not the identifier included in the sleep request signal is the same as the identifier included in the sleep response signal. When the identifier included in the sleep request signal is the same as the identifier included in the sleep response signal, the PHY layer unit 125-1 may determine that the end node indicated by the identifier included in the sleep response signal operates in the sleep mode. When the identifier included in the sleep request signal is different from the identifier included in the sleep response signal, or when the sleep response signal is not received within a preconfigured time, the sleep request signal may be retransmitted. That is, the sleep request signal including the identifiers of the end nodes required to transition to the sleep mode may be retransmitted in a broadcasting manner.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first end node including a physical (PHY) layer unit and a controller unit in a vehicle network, the operation method comprising:
   receiving, by the PHY layer unit, a wake-up signal from a second end node, the wake-up signal including a first identifier of an end node required to be woken up;
   in response to the wake-up signal, transitioning an operation state of the PHY layer unit from an OFF state to an ON state;
   comparing, by the PHY layer unit, a second identifier of the first end node with the first identifier; and
   in response to determining that the second identifier is different from the first identifier, transmitting the wake-up signal to a third end node without waking up the controller unit.

2. The operation method according to claim 1, further comprising, in response to determining that the second identifier is identical to the first identifier, transmitting, by the PHY layer unit, to the controller unit an indicator requesting to transition from the OFF state to the ON state.

3. The operation method according to claim 1, wherein the wake-up signal is a PHY layer signal generated by the PHY layer unit.

4. The operation method according to claim 1, wherein the first identifier is a local identifier used to identify the end node in a specific region of the vehicle network.

5. The operation method according to claim 1, wherein the first identifier is a group identifier indicating a plurality of end nodes required to be woken up according to the local event.

6. An operation method of a first end node in a vehicle network, the operation method comprising:
   identifying a third end node required to be woken up when an operation mode of the first end node transitions from a sleep mode to an active mode based on a first wake-up signal received from a second end node;
   generating a second wake-up signal including a first identifier of the first end node and a second identifier of the third end node; and
   transmitting the second wake-up signal.

7. The operation method according to claim 6, further comprising, in response to detecting a local event, identifying a fourth end node required to be woken up based on the local event before the generating of the second wake-up signal,
   wherein the second wake-up signal further includes a third identifier of the fourth end node.

8. The operation method according to claim 6, wherein each of the first and second identifier is a group identifier indicating a plurality of end nodes required to be woken up according to the local event.

9. The operation method according to claim 6, wherein the second wake-up signal is a PHY layer signal generated by a PHY layer unit included in the first end node.

10. An operation method of a first end node including a physical (PHY) layer unit and a controller unit in a vehicle network, the operation method comprising:
    receiving, by the PHY layer unit of the first end node operating in an active mode, a sleep request signal from a second end node;
    comparing, by the PHY layer unit, a first identifier of the first end node with a second identifier indicated by the sleep request signal; and
    in response to determining that the second identifier is identical to the first identifier, transmitting, by the PHY layer unit, to the controller unit an indicator requesting to transition from an ON state to an OFF state.

11. The operation method according to claim 10, further comprising transmitting, by the PHY layer unit, a sleep response signal indicating that the controller unit has transitioned from the ON state to the OFF state.

12. The operation method according to claim 11, wherein the sleep response signal is a PHY layer signal generated by the PHY layer unit.

13. The operation method according to claim 10, wherein the first identifier is a local identifier used to identify an end node in a specific region of the vehicle network.

14. The operation method according to claim 10, wherein the first identifier is a group identifier indicating a plurality of end nodes required to be woken up according to the local event.

* * * * *